US012729156B2

(12) United States Patent
Redemann et al.

(10) Patent No.: US 12,729,156 B2
(45) Date of Patent: Sep. 8, 2026

(54) APPARATUS AND PROCESS FOR PRODUCTION OF BURNT LIME OR DOLOMITE

(71) Applicant: Fels-Werke GmbH, Goslar (DE)

(72) Inventors: Tino Redemann, Wernigerode (DE); Gerrit Dombrowski, Cramme (DE); Henning Weber, Wolfenbüttel (DE)

(73) Assignee: FELS-WERKE GMBH, Goslar (DE)

( * ) Notice: Subject to any disclaimer, the term of this patent is extended or adjusted under 35 U.S.C. 154(b) by 312 days.

(21) Appl. No.: 18/457,208

(22) Filed: Aug. 28, 2023

(65) Prior Publication Data

US 2024/0101476 A1 Mar. 28, 2024

(30) Foreign Application Priority Data

Aug. 29, 2022 (EP) .................................... 22192635

(51) Int. Cl.
*C04B 2/12* (2006.01)
*C04B 2/10* (2006.01)
(Continued)

(52) U.S. Cl.
CPC ................ *C04B 2/12* (2013.01); *C04B 2/102* (2013.01); *F27B 1/005* (2013.01); *F27B 1/08* (2013.01);
(Continued)

(58) Field of Classification Search
CPC . C04B 2/12; C04B 2/102; F27B 1/005; F27B 1/08; F27B 1/22; F27D 17/20; F27D 17/10; F27D 17/13; F27M 2003/03
See application file for complete search history.

(56) References Cited

U.S. PATENT DOCUMENTS 6,261,093 B1 * 7/2001 Matros .................... F23G 7/068 432/39
2020/0048146 A1 2/2020 Wang et al.

FOREIGN PATENT DOCUMENTS

CN 101372333 B 8/2010
DE 2414496 A1 10/1975
(Continued)

OTHER PUBLICATIONS

Yang_Novel_Lime_Calcination_System_for_CO2_Capture_and_Its_Thermal-Mass_Balance_Analysis_2020.pdf (Year: 2020).*
DE-102021201549-A1 translation (Year: 2025).*

*Primary Examiner* — Michael G Hoang
*Assistant Examiner* — Kurt J Wolford
(74) *Attorney, Agent, or Firm* — McCoy Russell LLP

(57) ABSTRACT

An apparatus for production of burnt lime or dolomite has:
- a shaft furnace having a preheating zone, a reaction zone, a separation zone and a cooling zone;
- a first feed apparatus for $CO_2$ at the boundary of the separation zone to the reaction zone;
- a first removal apparatus at the boundary of the cooling zone to the separation zone;
- a second removal apparatus for $CO_2$ at the start of the preheating zone; and
- at least one heating apparatus, wherein the heating apparatus has a regenerator system.

The regenerator system has at least two regenerators, a preheater, a feed for fuel and a feed for fresh air;
- the second removal apparatus opens into the at least one heating apparatus; and
- the first feed apparatus is formed by the at least one heating apparatus for the shaft furnace.

4 Claims, 9 Drawing Sheets

(51) Int. Cl.

| | |
|---|---|
| ***F27B 1/00*** | (2006.01) |
| ***F27B 1/08*** | (2006.01) |
| ***F27B 1/22*** | (2006.01) |
| ***F27D 17/12*** | (2025.01) |
| ***F27D 17/13*** | (2025.01) |
| ***F27D 17/20*** | (2025.01) |

(52) U.S. Cl.

CPC ................ *F27B 1/22* (2013.01); *F27D 17/12* (2025.01); *F27D 17/20* (2025.01); *F27D 17/13* (2025.01); *F27M 2003/03* (2013.01)

(56) References Cited

FOREIGN PATENT DOCUMENTS

| | | | | |
|---|---|---|---|---|
| DE | 102013010909 | B3 | 8/2014 | |
| DE | 102021201549 | A1 * | 8/2022 | ................ F27B 1/08 |
| JP | 2009161391 | A | 7/2009 | |

* cited by examiner

APPARATUS AND PROCESS FOR PRODUCTION OF BURNT LIME OR DOLOMITE

CROSS REFERENCE TO RELATED APPLICATION

The present application claims priority to European Patent Application No. 22192635.5-1103 filed on Aug. 29, 2022. The entire contents of the above-listed application is hereby incorporated by reference for all purposes.

TECHNICAL FIELD

The invention relates to an apparatus for production of burnt lime or dolomite, having

- a shaft furnace having a preheating zone, a reaction zone, a separation zone and a cooling zone;
- a first feed apparatus for $CO_2$ at the boundary of the separation zone to the reaction zone;
- a first removal apparatus at the boundary of the cooling zone to the separation zone;
- a second removal apparatus for $CO_2$ at the start of the preheating zone;
- at least one heating apparatus, wherein the heating apparatus has a regenerator system.

The apparatus is characterized in that

- the regenerator system has at least two regenerators, a preheater, a feed for fuel and a feed for fresh air;
- the second removal apparatus opens into the at least one heating apparatus; and
- the first feed apparatus is formed by the at least one heating apparatus for the shaft furnace.

BACKGROUND

The invention further relates to a process for producing burnt lime or dolomite, in which the deacidification reaction proceeds under a $CO_2$ atmosphere and the process energy needed is introduced via heated $CO_2$ which is circulated.

SUMMARY

All of industry is facing the challenge of the energy transition and the switch to climatically neutral production. Specifically the lime industry is under particular pressure because of the process-related high $CO_2$ emissions that are released, for example, in the transformation of limestone to lime (1), or from calcite to calcium oxide.

$$CaCo_3 \rightarrow CaO + CO_2 \quad (1)$$

In a conventional shaft furnace, the energy input to burn the lime or the dolomite is assured by a combustion process within the shaft furnace. In addition to the $CO_2$ which is released from the limestone as it is burnt, $CO_2$ emissions arise as a result of the combustion of a carbonaceous fuel in the shaft furnace. Depending on the type of furnace, this leads overall to a $CO_2$ concentration of around 20% to 40% in the offgases. For the purposes of environmental protection, it is desirable to reduce the release of $CO_2$ to the environment. Furthermore, the economic standpoint must not be neglected, since state pricing of the emission of $CO_2$ is taking place to an increasing degree. In all adjacent industries, developments are therefore being driven in this sector in order to minimize $CO_2$ emission in lime burning. There is therefore great industrial interest in novel processes for burning lime or dolomite that work with maximum $CO_2$ neutrality and are therefore very efficient and energy-saving. There is also an increase in customer desire for "green lime". "Green lime" is used as a synonym for burnt lime produced in a climatically neutral manner.

The state of the art in this connection is, for example, conventional shaft furnaces with downstream $CO_2$ separation. The most technically mature technique for separation of the $CO_2$ from the offgases is amine scrubbing, by way of example. However, the amines have to be produced in an additional chemical plant downstream of the shaft furnace, which means extensive economic expenditure and personnel demands. The alternative utilization of fixed bed reactors or calcium looping methods is already known, but has not yet been tried or implemented on an industrial scale. In general, all methods have a very high energy requirement in order to concentrate the $CO_2$ in the offgases from a shaft furnace.

There are also known methods in which the combustion process in the shaft furnace is conducted with pure oxygen rather than air [DE 10 2013 010 909 B3, Maerz EcoKiln]. In these processes, a portion of the $CO_2$ formed in lime burning is fed back to the shaft furnace together with the oxygen. However, the operation of such a shaft furnace is costly because of the requirement for oxygen. A process in which $CO_2$ and oxygen are introduced into a shaft furnace as well as a fuel is likewise disclosed by JP 2009/161391 A.

Burnt lime is required in numerous industrial applications, including in the steel industry. There is a known process for provision of burnt lime in the steel industry that uses $CO_2$ as heat carrier medium in a shaft furnace [Yang et al.]. The shaft furnace in this process is divided into a preheating zone, a reaction zone, a separation zone and a cooling zone. The combustion process and hence the energy input in the process are not within the shaft furnace but outside it. All the $CO_2$ present in the shaft furnace is removed at a temperature of about 700° C. above the preheating zone and directed into a regenerator system. In the regenerator system, the $CO_2$ is heated to the required process temperature and then introduced into the shaft furnace at the boundary of the separation zone to the reaction zone.

A regenerator is in principle a heat transferer through which gas at a higher temperature and gas at a lower temperature flow alternately. As the gas at high temperature flows through the regenerator, the heat is stored intermediately in a storage medium (regenerator charging). Subsequently, the storage medium releases the heat to the gas at the lower temperature when it flows through the regenerator (regenerator discharging). The regenerator is generally charged and discharged in countercurrent. The gas for charging the regenerator flows through it from the top of the regenerator in the direction of the bottom of the regenerator, and the gas for discharging the regenerator flows through it in the exact opposite direction, from the bottom of the regenerator in the direction of the top of the regenerator.

The regenerator system in the process of Yang et al. comprises two regenerators and one preheater. The regenerators may be alternately loaded and unloaded in order to assure continuous heating of the $CO_2$. When the regenerators are loaded, these are heated to the required process temperature by the combustion of lean gas, and heated cooling air drawn off from the shaft furnace serves as combustion air. The mass flow rate of the cooling air drawn off thus determines the mass flow rate of the combustion gas which is guided through the regenerator. The lean gas is heated in a preheater prior to the combustion. Under these conditions, the combustion gas formed in the combustion typically reaches a combustion temperature above 2000° C.

and is introduced into the regenerator head when it arrives there. The combustion gas releases heat to the storage medium in the regenerator, and leaves the regenerator at the bottom at a temperature of about 700° C. The storage medium in the regenerator is therefore heated to a temperature of above 2000° C. at the top of the regenerator, and to a temperature of about 700° C. at the bottom of the regenerator.

When the $CO_2$ is discharged from the shaft furnace, it is passed through the laden regenerator. This is done by introducing the $CO_2$ into the bottom of the regenerator at a temperature of about 700° C. By the top of the regenerator, the $CO_2$ is heated to a temperature of about 1350° C. The top of the regenerator is thus contacted alternately with $CO_2$ at a temperature of about 1350° C. (on discharging) and combustion gases at a distinctly higher temperature (on charging). The entrance and exit temperatures mentioned in the regenerator result from the heat capacity flows of combustion gas and $CO_2$. The heat capacity flow ratio is far removed from 1 and thus leads to unfavourable temperature progressions in space and time in the regenerator. This is associated with numerous disadvantages. For instance, the significant thermal stress on the storage material has an adverse effect on the lifetime thereof as a result of the great temperature differences, especially in the region of the top of the regenerator. Furthermore, the temperature differences between the exiting combustion gas and incoming $CO_2$ in the region of the bottom of the regenerator are small, and so a portion of the storage material cannot be utilized for heat transfer. All the points mentioned have an adverse effect on the economic viability of this method of lime burning.

The process gas utilized in the prior art processes is lean gas, but this is not necessarily available as process gas in the lime industry. High-energy fuels are used in the lime industry, such as natural gas or brown coal dust. The lean gas is directed through a preheater and heated, but this cannot be applied to the high-energy fuels in the lime industry. The process described by Yang et al. therefore cannot be used without great difficulty in the lime industry; it would at least be necessary to additionally provide a lean gas as fuel. It would be much more advantageous to have an available process and apparatus for burning of lime or dolomite that can be employed directly in the lime industry without needing to provide the additional fuels.

US 2020/0048146 A1 discloses a system similar to that described by Yang et al., with the disadvantages already described.

Proceeding from the prior art, it is therefore an object of the invention to provide an apparatus in which the maintenance intensity of the regenerator system is reduced and the lifetime thereof is increased. As a result, the energy efficiency of a shaft furnace can be increased in the burning of limestone, remedying the disadvantages known from the prior art. Furthermore, the $CO_2$ that emanates from the deacidification of the limestone is to be separated out in highly concentrated form, and/or this is to be sent to further uses or suitable deposits.

For this purpose, the invention provides an apparatus and a process as described herein.

The features described hereinafter are applicable equally to the apparatus according to the invention and to the process according to the invention.

The invention provides an apparatus for production of burnt lime or dolomite. The apparatus comprises a shaft furnace and at least one heating apparatus. The shaft furnace has a preheating zone, a reaction zone, a separation zone and a cooling zone. At the start of the preheating zone, the carbonate-containing rock, referred to as limestone hereinafter, is introduced into the shaft furnace at a temperature $T_{KS}$ and a mass flow rate $m_{KS}$. Carbonate-containing rock in the context of the invention means untreated rock in the form of limestone or dolomite rock. Dolomite rock $CaMg[CO_3]_2$ is also known as dolomite spar, rhombic spar or pearl spar. All the descriptions hereinafter relating to limestone are equally applicable to dolomite rock, unless indicated otherwise. This is also applicable in particular to the specification of mass flow rates and temperatures. The deacidified carbonate-containing rock which is obtained after the burning operation is referred to as lime, burnt lime or quicklime in the case of limestone as starting material, or as burnt dolomite or dolomite in the case of dolomite rock as starting material. All the descriptions hereinafter relating to lime and burnt lime or quicklimes are equally applicable to burnt dolomite or dolomite, unless indicated otherwise.

Typically, the temperature of the limestone $T_{KS}$ corresponds to the ambient temperature. The mass flow rate $m_{KS}$ of the limestone is typically in the range from 1.65 to 1.85 $kg/kg_{lime}$ or $kg/kg_{dolomite}$, but may also be in the range above 1.85 kg/kg in the case of very high $MgCO_3$ contents in the starting rock or below 1.65 kg/kg in the case of a low carbonate content ($MgCO_3$ or $CaCO_3$ content) in the starting rock or high proportions of unburnt material in the lime end product. The limestone is heated in the preheating zone by the $CO_2$ flowing within the shaft furnace. $CO_2$ in the context of the invention means a gas mixture having a $CO_2$ concentration exceeding 75%, preferably exceeding 85%, more preferably exceeding 95%. In the preheating zone, the limestone is heated up to the required deacidification temperature which, in the case of a virtually pure $CO_2$ atmosphere, depending on the untreated rock, is in the region of 900° C. No deacidification reaction takes place yet in the preheating zone. An exception is dolomite rock, having a $MgCO_3$ content which is already deacidified at low temperatures.

The preheating zone is followed by the reaction zone, in which the limestone is supplied with further heat and deacidified. Virtually the entire deacidification reaction of the limestone takes place in the reaction zone, such that burnt lime is already present at the end of the reaction zone. Temperatures in the reaction zone are above 900° C.

The reaction zone is followed by the separation zone. At the boundary of the separation zone to the reaction zone is disposed a first feed apparatus which introduces $CO_2$ heated to process temperature $T_1$ into the shaft furnace at a mass flow rate $m_1$. The $CO_2$ with temperature $T_1$ provides the necessary energy input to enable a deacidification reaction of the limestone in the shaft furnace. There is thus advantageously no need for a combustion process within the shaft furnace.

Temperature $T_1$ is in the range of 950 and 1500° C., preferably in the range of 1000 and 1400° C., more preferably in the range of 1050 and 1350° C. Mass flow rate $m_1$ is greater than 4 $kg/kg_{lime}$.

The separation zone is followed by the cooling zone. At the end of the cooling zone, cooling air for cooling of the lime at a temperature $T_{air}$ and a mass flow rate $m_{air}$ is introduced into the shaft furnace by a second feed apparatus. The cooling air flows around and cools the burnt lime. Temperature $T_{air}$ is in the region of ambient temperature. The mass flow rate of cooling air $m_{air}$ is at least 0.7 $kg/kg_{lime}$.

According to the invention, the shaft furnace has a first removal apparatus between the cooling zone and the separation zone. This removal apparatus removes the heated cooling air at temperature $T_5$ from the shaft furnace at mass flow rate $m_5$. The first removal apparatus thus separates the cooling zone in accordance with the invention from the separation zone. The cooling zone chosen should be sufficiently large that it is possible to ensure sufficient cooling of the burnt lime. This is a measure customary in the art and is therefore already known from the prior art. Temperature $T_5$ is in the range of 100 and 1200° C., preferably in the range of 500 and 1000° C., more preferably in the range of 600 and 900° C. Mass flow rate $m_5$ is ideally equal to mass flow rate $m_{air}$. If cooling air is drawn in the direction of the reaction zone and sucked in with the $CO_2$ at the top of the furnace, $m_5<m_{air}$. If, by contrast, a portion of the $CO_2$ from the reaction zone gets into the region of the cooling air suction and is sucked away together with the cooling air, $m_5>m_{air}$. The top of the shaft furnace is the portion where the shaft furnace is charged with the limestone.

The separation zone serves for physical separation of the $CO_2$ atmosphere in the reaction zone and preheating zone, and of the air atmosphere in the cooling zone. At the end of the cooling zone is an apparatus for discharging the burnt lime. As a result, the cooled burnt lime is discharged from the shaft furnace at temperature $T_{out}$ and with mass flow rate $m_{out}$. Apparatuses for discharge are known to the person skilled in the art and are, for example, sliding stages by which the burnt lime is discharged from the shaft furnace. Temperature $T_{out}$ is typically in the range from 20 to at most 200° C.

According to the invention, the shaft furnace also has a second removal apparatus for $CO_2$ above the preheating zone at the top of the furnace. The $CO_2$ formed in the furnace is removed from the shaft furnace with a temperature $T_2$ and mass flow rate $m_2$ at the start of the preheating zone via the second removal apparatus. As already described, within the context of the invention $CO_2$ is understood to be a gas mixture having a $CO_2$ concentration exceeding 75%, preferably exceeding 85%, more preferably exceeding 95%.

A portion B of the $CO_2$ removed via the second removal apparatus can be conducted onward in the removal apparatus with a mass flow rate $m_B$, while a portion C with temperature $T_2$ and a mass flow rate $m_C$ is removed from the process.

Temperature $T_2$ is in the range of 80 and 700° C., preferably in the range of 80 and 400° C., more preferably in the range of 80 and 250° C. The mass flow rate $m_2$ above 1.7 $kg/kg_{lime}$, preferably in the range from 1.7 to 3.4 $kg/kg_{lime}$, more preferably in the range from 1.7 to 2.1 $kg/kg_{lime}$.

Mass flow rate $m_B$ is in the range above 1 $kg/kg_{lime}$, preferably in the range from 1 to 1.9 $kg/kg_{lime}$, more preferably in the range from 1 to 1.4 $kg/kg_{lime}$.

Mass flow rate $m_C$ is equal to the mass flow rate of $CO_2$ that emanates from the limestone on deacidification and is in the order of magnitude of 0.75 $kg/kg_{lime}$, preferably in the range from 0.7 to 0.85 $kg/kg_{lime}$.

The present invention also has at least one heating apparatus, wherein the heating apparatus has a regenerator system. According to the invention, the second removal apparatus opens into the at least one heating apparatus. The first feed apparatus of the shaft furnace is again formed by the at least one heating apparatus for the shaft furnace, meaning that it connects the at least one heating apparatus to the shaft furnace. The $CO_2$ removed via the second removal apparatus is thus directed in accordance with the invention at least partly into the at least one heating apparatus. The $CO_2$ is heated therein to temperature $T_W$ and fed to the shaft furnace via the first feed apparatus. The $CO_2$ is thus at least partly circulated in the present invention. The $CO_2$ which is not circulated, as already described, is removed from the process. An emission of diluted $CO_2$ from the shaft furnace into the atmosphere can thus advantageously be avoided. The $CO_2$ removed is available for further applications. Environmental pollution is correspondingly reduced, and an economic cost saving is achieved by the reduction in $CO_2$ levies.

According to the invention, the temperature $T_W$ at the exit from the at least one heating apparatus is equal to the inlet temperature $T_1$ of the $CO_2$ into the shaft furnace.

According to the invention, the at least one heating apparatus has a regenerator system, wherein the regenerator system has at least two regenerators, a preheater, a feed for fuel and a feed for fresh air. The regenerator system may also have more than two regenerators, for example three.

At least two regenerators are needed in order that it is possible to switch between them during the charging and discharging operations, and hence a continuous process regime can be assured.

According to the invention, fresh air at a temperature $T_F$ and a mass flow rate $m_F$ is heated to a temperature $T_{FV}$ in the first preheater and utilized as combustion air for combustion with a fuel. According to the invention, the fuel is selected from carbonaceous fuels and/or hydrogen. In a preferred embodiment, the fuel is a gaseous fuel. The use of a gaseous fuel has the advantage that input of ash into the regenerator on charging is avoided.

In one embodiment of the present invention, the combustion of the fuel takes place at the top of the regenerator. In a further embodiment of the invention, the combustion of the fuel takes place in a combustion chamber upstream of the top of the regenerator.

The fuel used for the combustion is more preferably a fuel selected from the group comprising natural gas, biogas, hydrogen and gasified solid fuels, for example wood gas. The combustion gases formed in the combustion at a temperature $T_7$ are directed through the regenerator in order to heat the storage material in the regenerator to temperature $T_{RK}$ at the top of the regenerator or $T_{RF}$ at the bottom of the regenerator, and hence to charge it. After they have passed through the regenerator, the combustion gases are led off as offgases. The offgases are at a temperature $T_{off}$. The temperature $T_{off}$ is in the range from 500 to 1200° C., preferably in the range from 650 to 1100° C., more preferably in the range from 800 to 1000° C. Advantageously, the offgases are directed through the first preheater in order to heat the fresh air to temperature $T_{FV}$ therein. It is thus possible to preheat the fresh air in an energy-efficient manner by means of the residual heat in the offgases.

It is possible via the supply of the fresh air with mass flow rate $m_F$ as combustion air to control the mass flow rate of the combustion gas that results from the combustion of the fresh air with the fuel. Preferably, the mass flow rate of the combustion gases that flows through the regenerator system is controlled in such a way that this is about the same as the mass flow rate $m_5$ of the $CO_2$ that flows through the regenerator system on discharging. In this way, it is possible to control the heat capacity flow ratio between combustion gas that flows through the regenerator system on charging and $CO_2$ that flows through the regenerator system on discharging. Preferably, the average heat capacity flow ratio of combustion gas and $CO_2$ in the regenerator system is between 0.7 and 1.3, preferably between 0.9 and 1.1; more preferably, the average heat capacity flow ratio is 1. The effect of this is that the regenerator in the regenerator system is more uniformly charged, and the temperature difference after charging between the top and bottom of the regenerator is smaller than in the processes utilized from the prior art. The storage material of the regenerator in the regenerator system can therefore be utilized more effectively. The effect of this is advantageously that the temperature difference between the temperature $T_{RK}$ of the storage material at the top of the regenerator and the temperature $T_W$ of the $CO_2$ on leaving the regenerator at the top is much smaller than in the processes known from the prior art. Advantageously, this significantly reduces the thermal stresses that occur in the regenerator material, especially at the top of the regenerator. The stress on the regenerator material is reduced, and the lifetime or maintenance interval thereof is increased compared to the regenerators known from the prior art (cf. Yang et al.).

Temperature $T_F$ is in the region of ambient temperature. Mass flow rate $m_F$ depends to a crucial degree on the mass flow rate of $CO_2$ which is directed through the regenerator system during discharging and is greater than 2.6 $kg/kg_{lime}$.

Temperature $T_{FV}$ is in the range from 100 to 1000° C., preferably in the range from 500 to 1000° C., more preferably in the range from 700 to 900° C.

In a further embodiment of the present invention, the first removal apparatus is connected to the regenerator system. In this case, the fresh air heated to temperature $T_{FV}$ in the preheater may additionally be supplied with at least a portion of the cooling air removed by the first removal apparatus at temperature $T_5$. In one embodiment, all the cooling air drawn off at temperature $T_5$ is supplied to the fresh air heated in the first preheater. The gas mixture then serves as combustion air in the combustion of the fuel, where the fuel is selected from carbonaceous fuels and/or hydrogen, especially selected from the group comprising natural gas, biogas, hydrogen and gasified solid fuels, for example wood gas. The combustion gases formed in the combustion at a temperature $T_7$ are directed through a regenerator and heat it to temperature $T_{RK}$ at the top of the regenerator or $T_{RF}$ at the bottom of the regenerator and hence charge the regenerator. The offgases leaving the regenerator may, as already described, be utilized for heating of the fresh air in the first preheater.

Natural gas in the context of the invention is understood to mean either L gas (low-calorific gas) or H gas (high-calorific gas). Biogas describes a high-energy gas mixture formed in the natural breakdown of organic material with exclusion of air. Wood gas is a gas which is obtained by the gasification of wood.

Regardless of whether fresh air or a gas mixture of fresh air and the cooling air removed from the shaft furnace by the first removal apparatus serves for the combustion, the use of the abovementioned fuels results in attainment of a temperature $T_7$ of the combustion gas which is at a somewhat higher temperature than the $CO_2$ at the exit from the regenerator system ($T_W$) and between 1000 and 1600° C., preferably between 1100 and 1500° C., more preferably between 1150 and 1450° C. The storage material in the at least one regenerator is heated in accordance with the invention to temperature $T_{RK}$ at the top of the regenerator and $T_{RF}$ at the bottom of the regenerator.

Temperature $T_{RK}$ is between $T_W$ and $T_7$. Temperature $T_{RF}$ is at a somewhat higher temperature level than the $CO_2$ at the inlet into the regenerator system ($T_8$).

In a further embodiment, the at least one heating apparatus also has an electrical heating system. In this case, a combination of an electrical heating system and a regenerator system is used. The $CO_2$ is then first heated by the regenerator system and then directed into the electrical heating system in which the $CO_2$ is supplied with further heat. This embodiment has the advantage that the regenerators used in the regenerator system do not have to be heated to the process temperature needed for the burning of the lime or dolomite. It is thus also possible to use storage materials in the regenerators that are suitable for temperatures below the process temperature in the shaft furnace. The process temperature for the burning of the lime or dolomite or the process temperature in the shaft furnace in this case describes the temperature that the $CO_2$ must have when fed into the shaft furnace via the first feed apparatus to introduce sufficient energy into the shaft furnace to allow the burning of the lime or dolomite to be performed.

In one embodiment of the invention, the shaft furnace has, in addition to the second removal apparatus for $CO_2$ above the preheating zone at the top of the furnace, a third removal apparatus for $CO_2$ above the reaction zone. The third removal apparatus may be disposed in accordance with the invention at the transition of the preheating zone to the reaction zone, or else upstream of the transition to the reaction zone in a region of the preheating zone. In a preferred embodiment of the invention, the third removal apparatus for $CO_2$ is disposed at the boundary of the reaction zone to the preheating zone.

In a further preferred embodiment of the invention, the third removal apparatus is disposed above the reaction zone in such a way that the temperature $T_3$ of the $CO_2$ removed via the third removal apparatus is in the range of 400 and 1000° C., preferably in the range of 600 and 1000° C., more preferably in the range of 800 and 900° C.

In a further embodiment of the present invention, the positions of the removal and feed apparatuses fix the zones of the shaft furnace. The preheating zone extends between the second removal apparatus and the third removal apparatus, the reaction zone extends between the third removal apparatus and the first feed apparatus, the separation zone extends between the first feed apparatus and the first removal apparatus, and the cooling zone extends between the first removal apparatus and the second feed apparatus.

By virtue of this configuration, it is possible to remove a portion A of the $CO_2$ from the shaft furnace with a temperature $T_3$ and a mass flow rate $m_3$ above the reaction zone via the third removal apparatus. The removal of $CO_2$ via the third removal apparatus reduces the mass flow rate of $CO_2$ in the preheating zone of the shaft furnace.

Temperature $T_3$ is in the range of 400 and 1000° C., preferably in the range of 600 and 1000° C., more preferably in the range of 800 and 900° C. Mass flow rate $m_3$, in a preferred embodiment of the present invention, should be chosen such that the $CO_2$ remaining in the furnace results in a capacity flow ratio of $CO_2$ to limestone in the preheating zone in the range from 1 to 2, preferably in the range from 1 to 1.6, more preferably in the range from 1 to 1.2.

In processes known from the prior art, the $CO_2$ flowing within the shaft furnace is drawn off exclusively at the top of the furnace. The heat capacity flow ratio Ω, which is defined by the heat capacity flows of two streams of matter in a heat transferer as $$\Omega = m_1 \cdot c_1 / (m_2 \cdot c_2), \quad (2)$$

where m is the mass flow rate and c the specific heat capacity, is found to be extremely unfavourable in the preheating zone and therefore in general. In the preheating zone, the heat capacity flow of the limestone is much lower than the heat capacity flow of the $CO_2$, and so the result is that the $CO_2$ is drawn off from the shaft furnace at a relatively high temperature of about 700° C. This high temperature leads to a correspondingly high loss of heat in the removal of the excess $CO_2$ from the overall process. This lowers the energy efficiency of the process. The heat capacity flow ratio of $CO_2$ to limestone in these processes is typically in the range from 2.5 to 4 [Yang et al.].

In this embodiment of the invention, the heat capacity flow ratio in the preheating zone is significantly reduced by comparison with the prior art processes and the exit temperature $T_2$ of the $CO_2$ at the top of the furnace is much lower, which reduces the loss of heat via the $CO_2$ to be discharged ($m_C$) and hence increases the energy efficiency of the shaft furnace system.

According to the invention, the third removal apparatus opens into the second removal apparatus outside the shaft furnace and before the second removal apparatus opens into the at least one heating apparatus. Once the $CO_2$ from the third removal apparatus has been introduced into the second removal apparatus, the $CO_2$ flows onward into the at least one heating apparatus with temperature $T_8$ and mass flow rate $m_8$.

Temperature $T_8$ is in the range from 500 to 1000° C., preferably in the range from 600 to 900° C., more preferably in the range from 650 to 900° C. Mass flow rate $m_8$ is equal to $m_1$.

In one embodiment of the present invention, the second removal apparatus is connected directly to the first feed apparatus via a shortcut conduit upstream of the point at which the third removal apparatus opens into it. This makes it possible to mix a portion D with the mass flow rate $m_D$ of the $CO_2$ drawn off via the second removal apparatus at temperature $T_2$ with the $CO_2$ which is introduced into the shaft furnace via the first feed apparatus. This makes it possible to control the temperature $T_1$ independently of the at least one heating apparatus used. If it is not possible by means of the at least one heating apparatus used to guarantee a constant temperature of the $CO_2$ on departure from the first heating system, this can advantageously be compensated for by control of the mass flow rate $m_D$ which is fed in via the shortcut conduit.

Mass flow rate $m_D$ is much lower than $m_1$, and is in the region of less than 1 $kg/kg_{lime}$.

In a further embodiment of the present invention, the first removal apparatus is in contact with the second removal apparatus in the form of a second preheater. The second preheater is preferably positioned such that the second removal apparatus passes through the preheater before the third removal apparatus opens into the second removal apparatus, if the shaft furnace has a third removal apparatus. This embodiment makes it possible for the heated cooling air at temperature $T_5$ removed via the first removal apparatus to be directed at least partly into the preheater, where it is utilized to heat a portion of the $CO_2$ removed via the second removal apparatus. The $CO_2$ that flows through the second preheater is heated from temperature $T_2$ to temperature $T_{2V}$. The preheater makes it possible for heat to be transferred between the two gas streams that flow past one another. This embodiment is particularly advantageous if the shaft furnace has a third removal apparatus, since the temperature $T_2$ of the $CO_2$ removed at the top of the furnace is then so low that heating by the second preheater is efficient and results in an economic advantage.

This embodiment enables a further saving of energy since the heat from the cooling air removed via the first removal apparatus can be utilized for heating of the circulated $CO_2$. Furthermore, there is the advantage that in-process heat can be recovered from the heated cooling air without this cooling air being directed into the regenerator system as combustion air and leading to unwanted introduction of dust.

Temperature $T_{2V}$ is greater than $T_2$ via the heat recovery and is in the range of 200 and 1000° C., preferably in the range of 400 and 900° C., more preferably in the range of 500 and 800° C.

Removal apparatus in the context of the present invention is understood to mean an apparatus having at least one means of removing a gas and at least one conduit for passing the gas removed onward. Means of removing gases are, for example, suction apparatuses such as fans, especially hot gas fans. The mass flow rate of the gas which is drawn off is preferably controllable.

Feed apparatus in the context of the present invention is understood to mean an apparatus having at least one means of introducing a gas into a vessel, especially into a shaft furnace. The feed apparatus accordingly also comprises at least one conduit for passing the gas onward. The mass flow rate of the gas which is introduced is preferably controllable.

The conduits of the feed apparatuses and/or removal apparatuses, in a preferred embodiment, also have filters, fans and valves. In a preferred embodiment, the removal apparatuses in particular have filters for dedusting the $CO_2$ removed. Filters refer here generally to apparatuses for dedusting gases. These may be, for example, fabric filters or else hot gas cyclones. Valves may be used for control, stoppage, division and/or redirection of the mass flows. Blowers are used to create the gas flow in the conduits.

In order to monitor the process parameters of the combustion operation, the apparatus may have a temperature sensor and/or a pressure sensor at at least one point. The apparatus preferably has temperature sensors and/or pressure sensors at various suitable points. These may be positioned, for example, in the conduits of the feed apparatuses and or in the conduits of the removal apparatuses. The apparatus preferably has temperature sensors and/or pressure sensors at the points needed to enable control and/or monitoring of the apparatus according to the invention.

In one embodiment, the apparatus may accordingly comprise a controller with which the process parameters (temperature, pressure, mass flow rates) can be monitored and controlled.

All the features of the invention that have been described can be combined with one another in accordance with the invention.

The invention further provides a process for producing burnt lime or dolomite in an apparatus having

- a shaft furnace having a preheating zone, a reaction zone, a separation zone and a cooling zone;
- a first feed apparatus at the boundary of the separation zone to the reaction zone;
- a first removal apparatus at the boundary of the cooling zone to the separation zone;
- a second removal apparatus at the start of the preheating zone;
- at least one heating apparatus, wherein the heating apparatus has a regenerator system;
- wherein
- the regenerator system has at least two regenerators, a preheater, a feed for fuel and a feed for fresh air;
- the second removal apparatus opens into the at least one heating apparatus; and
- the first feed apparatus is formed by the at least one heating apparatus for the shaft furnace;

characterized in that a) limestone and/or dolomite rock is introduced into the preheating zone of the shaft furnace;

b) preheated $CO_2$ at a temperature $T_1$ and with a mass flow rate $m_1$ is introduced into the shaft furnace via the first feed apparatus between separation zone and reaction zone;

c) $CO_2$ with temperature $T_2$ is removed from the shaft furnace via the second removal apparatus at the start of the preheating zone, a portion B of the $CO_2$ removed is passed onward with mass flow rate $m_B$, and a portion C is sent to another use and/or collected in compressed form in a suitable deposit with mass flow rate $m_C$;

d) portion B of the $CO_2$ is heated to temperature $T_W$ in the at least one heating apparatus, and the $CO_2$ with temperature $T_W$ forms at least a portion of the preheated $CO_2$ which is fed to the shaft furnace in process step b) via the first feed apparatus;

e) the burnt lime or dolomite is cooled in the cooling zone by cooling air supplied, and the cooling air with temperature $T_5$ and mass flow rate $m_5$ is removed again from the shaft furnace between the cooling zone and the separation zone; and f) the cooled burnt lime or dolomite is discharged from the shaft furnace with temperature $T_{out}$ and mass flow rate $m_{out}$; and in that the regenerator system is charged by a process having the steps heating fresh air to a temperature $T_{FV}$ in the preheater;

sending the fresh air heated to temperature $T_{FV}$ for combustion with a fuel selected from carbonaceous fuels and/or hydrogen; and introducing the combustion gases formed in the combustion into at least one of the regenerators at a temperature $T_7$ and heating the top of the regenerator to temperature $T_{RK}$ and the bottom of the regenerator to temperature $T_{RF}$.

All the features and advantages set out for the apparatus according to the invention are also applicable to the process according to the invention and vice versa.

In a preferred embodiment, the process is executed in the apparatus according to the invention.

In the process according to the invention, limestone or dolomite at temperature $T_{KS}$ is introduced into the preheating zone of the shaft furnace at a mass flow rate $m_{KS}$. In addition, $CO_2$ is introduced into the shaft furnace via the first feed apparatus at a temperature $T_1$ with a mass flow rate $m_1$ at the boundary of the separation zone to the reaction zone. The limestone or dolomite rock is heated by the $CO_2$ in the preheating zone and reaches a temperature in the reaction zone which is sufficient to start the deacidification reaction.

The $CO_2$ with temperature $T_2$ and mass flow rate $m_2$ is removed from the shaft furnace at the start of the preheating zone. A portion B of the $CO_2$ removed is passed onward with mass flow rate $m_B$, and a portion C is sent to another use and/or collected in compressed form in a suitable deposit with mass flow rate $m_C$.

Portion B of the $CO_2$ is heated to temperature $T_W$ in the at least one heating apparatus, and the $CO_2$ with temperature $T_W$ forms at least a portion of the preheated $CO_2$ which is fed to the shaft furnace in process step b) at the boundary of the separation zone to the reaction zone. The burnt lime or dolomite is cooled in the cooling zone by cooling air supplied, and the heated cooling air with temperature $T_5$ and mass flow rate $m_5$ is removed from the shaft furnace between the cooling zone and the separation zone. According to the invention, the cooling air is introduced into the shaft furnace at a temperature $T_{air}$ and a mass flow rate $m_{air}$.

The cooled burnt lime or dolomite is discharged from the shaft furnace at the end of the cooling zone at temperature $T_{out}$ and with mass flow rate $m_{out}$.

The regenerator system is charged according to the invention by a process having the steps heating fresh air to a temperature $T_{FV}$ in the preheater;

sending the fresh air heated to temperature $T_{FV}$ for combustion with a fuel selected from carbonaceous fuels and/or hydrogen; and introducing the combustion gases formed in the combustion into at least one of the regenerators at a temperature $T_7$ and heating the top of the regenerator to temperature $T_{RK}$ and the bottom of the regenerator to temperature $T_{RF}$.

In one embodiment of the present invention, in the process according to the invention, furthermore a portion A of the $CO_2$ with mass flow rate $m_3$ and temperature $T_3$ is removed from the shaft furnace at the boundary of the reaction zone to the preheating zone; and in process step d), portion A of the $CO_2$ is combined with portion B of the $CO_2$ to give a mixed gas with temperature $T_8$, and the mixed gas with temperature $T_8$ is heated to temperature $T_W$ in the at least one heating apparatus, and the $CO_2$ with temperature $T_W$ forms at least a portion of the preheated $CO_2$ which is fed to the shaft furnace in process step b) at the boundary of the separation zone to the reaction zone.

In this embodiment, a portion A of the $CO_2$ in the shaft furnace is removed from the shaft furnace via the third removal apparatus at a temperature $T_3$ with a mass flow rate $m_3$ between reaction zone and preheating zone. The rest of the $CO_2$ in the shaft furnace is removed from the shaft furnace at the start of the preheating zone at a temperature $T_2$ and a mass flow rate $m_2$. A portion B of the $CO_2$ removed is passed onward with mass flow rate $m_B$, and a portion C is drawn off from the process as highly concentrated $CO_2$ with a mass flow rate $m_C$ and can be sent to further uses or suitable deposits.

Portion A of the $CO_2$ is combined with portion B of the $CO_2$, and the mixed gas at temperature $T_8$ is directed into a heating apparatus, where it is heated to temperature $T_W$. In one embodiment of the present invention, the $CO_2$ that leaves the heating apparatus at temperature $T_W$ is the $CO_2$ which is fed to the shaft furnace at mass flow rate $m_1$ in process step b) between the separation zone and the reaction zone. In this embodiment, temperature $T_1$ is equal to temperature $T_W$.

Portion A and portion B of the $CO_2$ removed from the shaft furnace are introduced back into the shaft furnace and hence form a circuit. The deacidification reaction (equation 1) in the shaft furnace releases additional $CO_2$ on burning of the lime or dolomite. This excess $CO_2$ which is not required for the circulation in the process for burning lime is removed from the process as portion C, sent to a further use, or compressed and stored in suitable deposits. The shaft furnace itself can therefore advantageously be operated by the process according to the invention in such a way that the $CO_2$ that occurs in the deacidification from the limestone or dolomite is separated out in highly concentrated form and is not released into the environment diluted with combustion gases.

The removal of portion A of $CO_2$ at the boundary of the reaction zone to the preheating zone reduces the mass flow of $CO_2$ in the preheating zone. The heat capacity flow ratio of $CO_2$ to limestone or dolomite in the preheating zone is thus favourably influenced. As a consequence, according to the invention, the temperature $T_2$ with which the remaining $CO_2$ is drawn off at the start of the preheating zone, i.e. at the top of the shaft furnace, lowers, which leads to a saving of energy in the overall process. The heat capacity flow ratio of $CO_2$ to limestone is in the range from 1 to 2, preferably in the range from 1 to 1.6, more preferably in the range from 1 to 1.2.

Preferably, the removal by suction of portion A of the $CO_2$ removes between 30% and 90%, preferably between 40% and 85%, more preferably between 55% and 75%, of the overall gaseous $CO_2$ above the reaction zone. The mass flow $m_3$ to be removed by suction can be controlled, for example, by the exit temperature of the $CO_2$ at the top of the furnace.

The temperature $T_2$ of the $CO_2$ removed by suction at the start of the preheating zone is in this embodiment within a range of 80 and 700° C., preferably in the range of 80 and 400° C., more preferably in the range of 80 and 250° C. By virtue of the correspondingly low temperature, it is advantageously sufficient to design $CO_2$ fans and $CO_2$ filters for this lower temperature range.

In principle, the removal of the $CO_2$ and of the cooling air by suction from the shaft furnace is effected according to the invention by means of suitable fans. Especially in the case of removal of the $CO_2$ by suction at the top of the furnace, a $CO_2$ filter that filters unwanted dusts is connected downstream of the suction. The filter is designed for the corresponding temperatures of the $CO_2$. If the cooling air removed from the shaft furnace by suction is used further, for example in a heating apparatus or a preheater, it passes through a suitable filter or hot gas cyclone after being removed from the shaft furnace by suction and hence freed of dusts.

In one embodiment of the present process, the process further comprises the step that a portion D of the $CO_2$ removed in process step c) is fed into the $CO_2$ preheated to temperature $T_W$ via a shortcut conduit before it is introduced into the shaft furnace.

In this embodiment, portion D at a mass flow rate $m_D$ and temperature $T_2$ is mixed with the $CO_2$ with temperature $T_W$ from the heating apparatus and introduced into the shaft furnace. This makes it possible to compensate for fluctuations in temperature because of the heating of $m_1$ in the heating apparatus via mixing with mass flow $m_D$. The advantages of this embodiment have already been described in connection with the apparatus according to the invention.

In a further embodiment of the present process, prior to process step d), portion B of the $CO_2$ removed in process step c) is heated to temperature $T_{2V}$ in a preheater by a portion of the cooling air removed in process step e).

In one embodiment, as a result of the removal of portion A of the $CO_2$ from the shaft furnace, as described, the temperature $T_2$ of portion B of the $CO_2$ removed is within a range of 80 and 700° C., preferably in the range of 80 and 400° C., more preferably in the range of 80 and 250° C., and hence below the temperature $T_5$ with which the heated cooling air is removed from the shaft furnace. In this embodiment, this is utilized to heat portion B of the $CO_2$ removed by means of a preheater before this is supplied with portion A. For this purpose, both a portion of the cooling air removed and portion B of the $CO_2$ are directed through a preheater in which the heat transfer takes place. The mass flow rate mx of the cooling air which is directed into the preheater is in the range from 0% to 100%, preferably in the range from 60% to 100%, more preferably in the range from 80% to 100%. In one embodiment of the process, the entirety of the cooling air removed from the shaft furnace is directed through the preheater.

In one embodiment of the present invention, the fresh air heated to temperature $T_{FV}$ in the preheater is additionally supplied with a portion of the cooling air removed in process step e), and the gas mixture serves for combustion with a fuel selected from carbonaceous fuels and/or hydrogen. The combustion gases formed in the combustion are guided through at least one regenerator at a temperature $T_7$ and heat the regenerator to temperature $T_{RK}$ at the top of the regenerator and $T_{RF}$ at the bottom of the regenerator.

In one embodiment of the process, all the cooling air removed from the shaft furnace in process step e) is fed into the fresh air heated in the preheater.

Advantageously, it is possible to flexibly choose the fuel for charging the regenerator. Preference is given to using fuels selected from carbonaceous fuels and/or hydrogen, especially selected from the group comprising natural gas, biogas, hydrogen and gasified fuels, such as wood gas. It is therefore possible to utilize either fossil fuels such as natural gas or fuels that enable a $CO_2$-neutral combustion process. Fuels that enable a $CO_2$-neutral combustion process are, for example, biogas, hydrogen and gasified solid fuels, such as wood gas. In the shaft furnace, all $CO_2$ formed and introduced is removed by suction and either conducted onward in a circuit or removed from the process and sent to another use and/or compressed and stored in suitable deposits. When a regenerator with a $CO_2$-neutral combustion process is used, there is likewise no emission of $CO_2$ which is of relevance for the calculation of a $CO_2$ levy. This embodiment of the process according to the invention thus creates a way of producing burnt lime in a $CO_2$-neutral manner from limestone in a shaft furnace. $CO_2$-neutral production is likewise possible when the heating apparatus in the process step is a combination of a regenerator system and an electrical heating system.

Even when fossil fuels are used, it is possible to greatly reduce emission of $CO_2$ compared to the processes known from the prior art.

Furthermore, the temperature progression in the regenerator is much more favourable since the difference in temperature at the top of the regenerator on charging with $CO_2$ and combustion gas at a heat capacity flow ratio of about one is much smaller than in the case of regenerator systems as utilized in the prior art. The present process can exploit the storage area of the regenerator over the entire area and hence much more effectively.

The process according to the invention additionally makes it possible to influence the reactivity of the burnt lime or dolomite produced in various ways. Reactivity describes the reactiveness of the burnt lime or dolomite. This is dependent primarily on the combustion temperature, combustion time and chemical composition of the raw limestone. A homogeneous combustion temperature in particular results in a higher reactivity [Schiele/Berens].

In one embodiment of the process of the invention, the combustion temperature in the shaft furnace is (i) controlled by controlling temperature $T_1$ while mass flow rate $m_1$ is constant or (ii) the combustion temperature in the shaft furnace is controlled by controlling the mass flow rate $m_1$ while temperature $T_1$ is constant.

In both embodiments, the temperature $T_2$ with which the $CO_2$ is removed from the shaft furnace at the start of the preheating zone can be kept constant by controlling the amount of $CO_2$ which is drawn off from the shaft furnace at the boundary of the reaction zone to the preheating zone.

In a further embodiment of the present invention, the reactivity of the burnt lime or dolomite is controlled by controlling the mass flow rate $m_{out}$. It is possible in this way to adjust the dwell time of the lime or dolomite in the shaft furnace. This is possible since the dwell time of the lime or dolomite in the shaft furnace is advantageously independent of the energy input into the shaft furnace and of the amount of cooling air introduced into the shaft furnace. For example, it is possible, in the case of a constant lime throughput or dolomite throughput (mass flow rate $m_{out}$), to increase the amount of circulating $CO_2$ (mass flow rate $m_1$) and/or the temperature thereof (temperature $T_1$) such that the average $CO_2$ temperature in the reaction zone increases and the lime or dolomite dwells at higher temperature. This forces the sintering process and decreases reactivity. This is not assured by processes according to the prior art. There is a dependence here between lime throughput or dolomite throughput in the furnace, i.e. the dwell time of the lime or of the dolomite in the furnace, the amount of fuel and the amount of combustion air.

The process and the apparatus that are provided by the present invention offer numerous advantages over the prior art.

The use of the regenerator system with a fresh air feed as combustion air allows the mass flow rate of the combustion gas through a regenerator on charging to be controlled such that the heat capacity flow ratio between combustion gas flowing through the regenerator system on charging and $CO_2$ flowing through the regenerator system on discharging is between 0.9 and 1.1.

Thermal stresses at the top of the regenerator are minimized, and the maintenance times and lifetime of the regenerator system are increased as a result. It is thus possible to increase the economic efficiency of the process and the apparatus.

The apparatus, by virtue of the configuration of the third removal apparatus, makes it possible to favourably influence the heat capacity flow ratio of limestone to $CO_2$ in the region of the preheating zone above the third removal apparatus, and hence to reduce the heat loss via the removal of $CO_2$ via the first removal apparatus at the top of the furnace at a lower temperature by comparison with the processes known from the prior art.

The invention provides an inexpensive process and an apparatus for burning of lime or dolomite with integrated separation of the $CO_2$ formed in the deacidification of the limestone or dolomite, with simultaneous flexibility of energy supply. The flexibility of energy supply results from the flexible use of the first heating apparatus in the form of a regenerator system, of an electrical heating system, or of a combination of these. In this way, it is possible to use energy on the basis of fossil or renewable fuels. It is likewise possible to combine this with electrical energy and to supply heat exclusively via an electrical heating system.

The process and the apparatus thus have all the prerequisites for $CO_2$-neutral lime production. The excess $CO_2$ in this case is sent to a further use and/or compressed and stored in suitable deposits.

This reduces the dependence of the production costs on state $CO_2$ levies and simultaneously increases the production volume of "green lime".

The process of the invention additionally offers the option of influencing the reactivity of the burnt lime or dolomite produced.

The process of the invention and the apparatus of the invention enable an increase in the quality of the burnt lime or dolomite produced. Since the combustion process takes place outside the shaft furnace in the case of the use of a regenerator system, the burnt lime or dolomite in the shaft furnace does not come into direct contact with the combustion process itself, or with the fossil or renewable energy carriers used and the ashes thereof. The use of an electrical heating system also prevents a combustion process within the shaft furnace.

The apparatus according to the invention and the process according to the invention, by comparison with the processes and apparatus known from the prior art, are more energy-efficient and thus more economically viable.

Furthermore, the apparatus according to the invention and the process according to the invention are usable in the lime industry since it is possible to use high-energy fuels compared to the prior art, and hence to utilize existing infrastructure in the lime works.

BRIEF DESCRIPTION OF THE FIGURES

The present invention is elucidated in detail hereinafter by 9 figures with one comparative example and 2 working examples.

DETAILED DESCRIPTION

Figure 1:
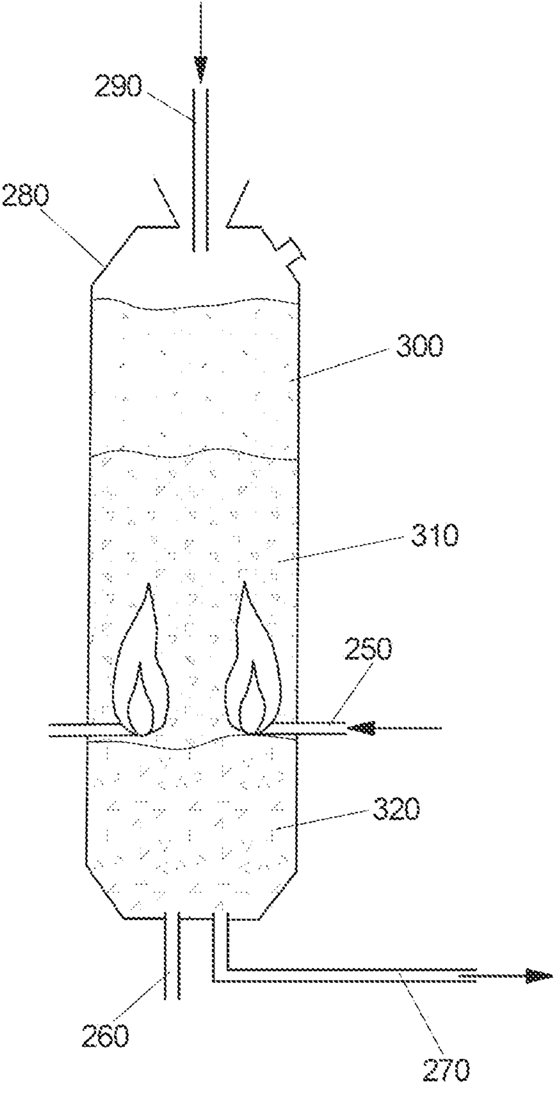
FIG. 1 shows a shaft furnace for burning of lime from the prior art.

FIG. 1 shows a shaft furnace 280 for burning of lime from the prior art. In the shaft furnace 280, limestone is added via the feed 290. The shaft furnace 280 has a preheating zone 300, a reaction zone 310 and a cooling zone 320. Between cooling zone 320 and reaction zone 310, air and fuel are introduced into the shaft furnace 280 via a fuel and air feed 250. The combustion reaction in the shaft furnace 280 generates sufficient energy to deacidify the limestone. At the bottom end of the cooling zone 320, cooling air is introduced via the feed 260 in order to cool the burnt lime before the lime discharge 270. These processes from the prior art do not offer any technical means of generating highly concentrated $CO_2$ within the process that can be sent directly to further utilization and/or compressed and stored in suitable deposits. Alternatively, it is possible to use solely downstream $CO_2$ separation methods that entail considerable energy expenditure and financial investment.

Figure 2:
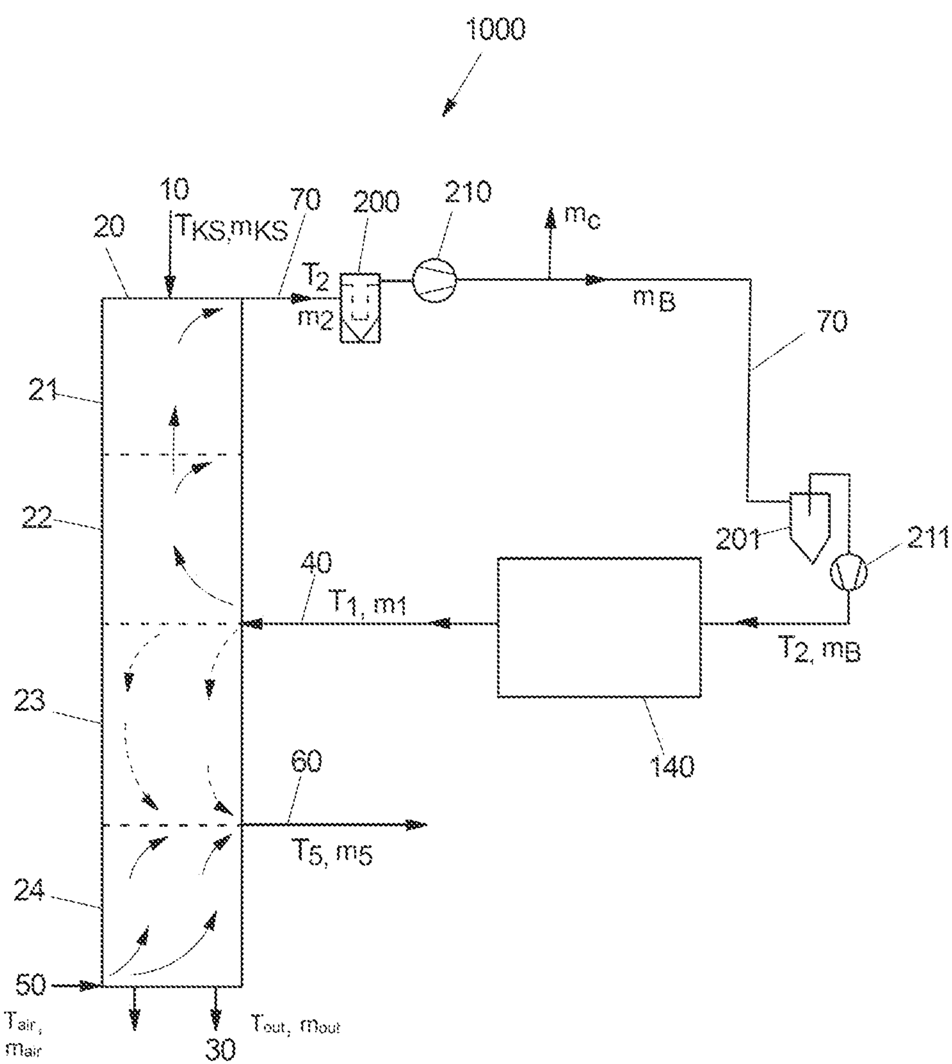
FIG. 2 shows one embodiment of the present invention.

FIG. 2 shows one embodiment of the present invention. The shaft furnace 20 has a preheating zone 21, a reaction zone 22, a separation zone 23 and a cooling zone 24. The limestone is introduced into the shaft furnace at the start of the preheating zone via the limestone feed 10. The limestone is at a temperature $T_{KS}$ and is introduced into the shaft furnace 20 at a mass flow rate $m_{KS}$. $CO_2$ at temperature $T_1$ with a mass flow rate $m_1$ is introduced into the shaft furnace 20 via the first feed apparatus 40 at the boundary of the separation zone 23 to the reaction zone 22. The temperature $T_1$ and mass flow rate $m_1$ of the $CO_2$ are chosen such that sufficient energy is introduced into the shaft furnace 20 to deacidify the limestone in the reaction zone 22. At the start of the preheating zone 21, at the top of the shaft furnace 20, the $CO_2$ is drawn off from the shaft furnace 20 via the second removal apparatus 70 at a temperature $T_2$ and a mass flow rate $m_2$. The removal apparatus 70 has a filter 200 for dedusting of $CO_2$ and a fan 210 for conducting the $CO_2$ onward in the removal apparatus. A portion $m_C$ of the $CO_2$ is removed from the process. This portion can be provided for further utilization in other processes and/or compressed and stored in suitable deposits.

A portion $m_B$ of the $CO_2$ in the second removal apparatus 70 is passed onward. The $CO_2$ which is subsequently passed onward in the second removal apparatus 70 has a temperature $T_2$ and a mass flow rate $m_B$. Before the $CO_2$ is directed into the heating apparatus 140 at temperature $T_2$, it is dedusted again in a hot gas filter or hot gas cyclone 201 and passes through a hot gas fan 211. The $CO_2$ is heated to a temperature $T_W$ in the heating apparatus 140. According to the invention, the heating apparatus has a regenerator system 90 or a combination of a regenerator system 90 with an electrical heating system 100. After leaving the heating apparatus, the $CO_2$ arrives back in the shaft furnace 20 via the first feed apparatus. In this embodiment, the temperature $T_W$ corresponds to the temperature $T_1$. A portion of the $CO_2$ thus flows in a circuit and introduces the energy required for the deacidification reaction inter alia into the shaft furnace 20.

There is therefore a virtually pure $CO_2$ atmosphere in the shaft furnace 20 within the preheating zone 21 and the reaction zone 22. At the end of the cooling zone 24, cooling air is introduced into the shaft furnace 20 at a mass flow rate $m_{air}$ via the second feed device 50. The cooling air is at a temperature $T_{air}$ and cools the burnt lime in the cooling zone 24. At the boundary of the cooling zone 24 to separation zone 23, the cooling air heated to temperature $T_5$ is drawn off again from the shaft furnace 20 at a mass flow rate $m_5$. Since the separation zone 23 is between the cooling zone 24 and the reaction zone 22, a separation of the $CO_2$ atmosphere in the preheating zone 21 and reaction zone 22 from the air atmosphere in the cooling zone 24 is enabled. The cooling air removed at temperature $T_5$ can be utilized further within the process in accordance with the invention in the apparatus or in the process, or else not be utilized further within the process.

The burnt lime is discharged from the shaft furnace by an apparatus for discharge 30 with temperature $T_{out}$ and mass flow rate $m_{out}$.

The inventive apparatus 1000 thus makes it possible to use $CO_2$ as an energy carrier in order to introduce the energy demand for the deacidification reaction into the shaft, where the $CO_2$ is circulated, or excess $CO_2$ is sent to a further use and/or compressed and stored intermediately in suitable deposits. Furthermore, no combustion reaction takes place within the shaft furnace 20, which means that no fuels or ashes thereof are introduced into the shaft furnace 20.

Figure 3:
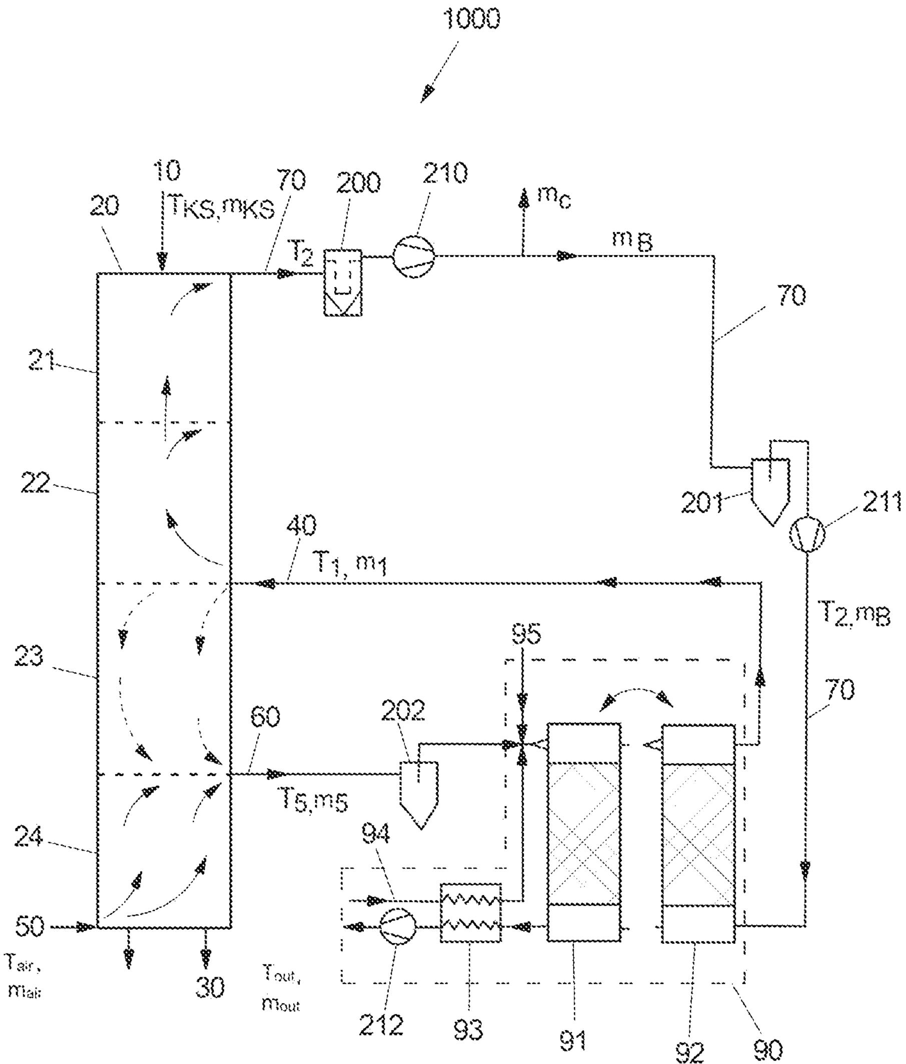
FIG. 3 shows a further embodiment of the present invention.

FIG. 3 shows a further embodiment of the present invention. The construction is the same as is described in FIG. 2. The heating apparatus 140 in this embodiment is a regenerator system 90. The regenerator system 90 has two regenerators 91, 92 that can be charged and discharged in alternation. The $CO_2$ flows through the second removal apparatus 70 with mass flow rate $m_B$ and temperature $T_2$ at the bottom of the charged regenerator, where it is heated to temperature $T_W$, and it is fed back to the shaft furnace 20 from the top of the regenerator via the first feed apparatus 40. In this embodiment, temperature $T_W$ corresponds to temperature $T_1$ with which the $CO_2$ is introduced into the shaft furnace 20. The regenerators 91, 92 of the regenerator system 90 are charged with a combustion gas. The regenerator system 90 also has a first preheater 93. A feed of fresh air 94 directs fresh air at temperature $T_F$ into the preheater with a mass flow rate $m_F$, where it is heated to temperature $T_{FV}$. In this embodiment, the cooling air removed from the shaft furnace 20 at the boundary of the cooling zone 24 to the separation zone 23 via the first removal apparatus 60 is mixed with the heated fresh air at temperature $T_{FV}$, and the mixed gas serves as combustion air for the combustion. Before the fresh air is mixed with the cooling air, the cooling air at temperature $T_5$ is dedusted beforehand in a suitable hot gas filter or hot gas cyclone 202 in order to keep the introduction of dust into the regenerator system 90 as small as possible.

The combustion gas is created by feeding in a fuel via a feed of fuel 95. The combustion air used here is the heated fresh air and the heated cooling air. The combustion gas at a temperature $T_7$ which is generated in the combustion of the fuel is directed through the regenerators 91, 92, in order to charge these. The combustion gas is introduced at the top of the regenerator, heats it to a temperature $T_{RK}$, and is led off again at the bottom of the regenerator. This heats the bottom of the regenerator to a temperature $T_{RF}$. The combustion gas led off at the bottom of the regenerator is advantageously directed through the first preheater 93, which means that the residual heat in the combustion gas can be utilized for heating of the fresh air. In order to remove the cooling air from the shaft furnace, to suck in the fresh air and then to direct the combustion gas through the regenerator, it is possible to use a fan 212.

Figure 4:
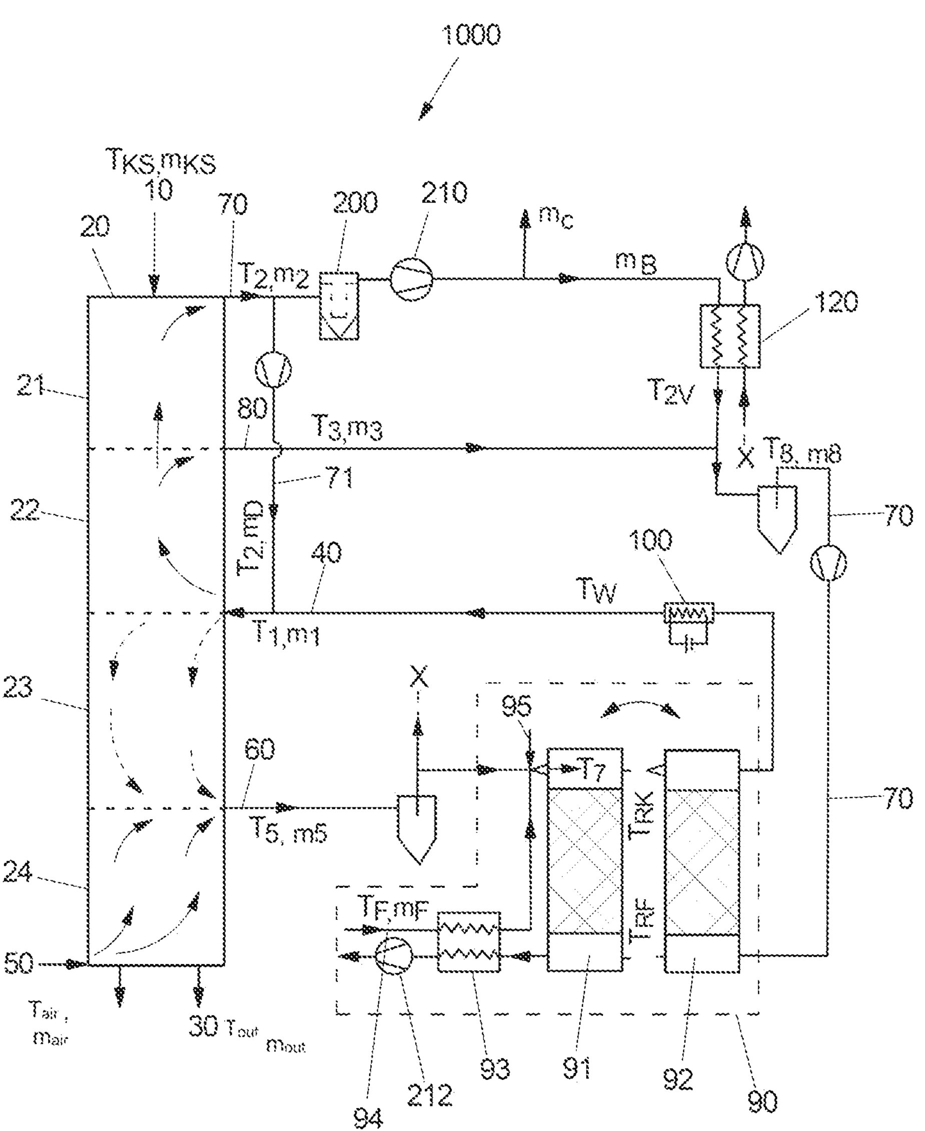
FIG. 4 shows a further embodiment of the present invention.

FIG. 4 shows a further embodiment of the present invention, wherein the construction is similar in principle to that in FIG. 2. In this embodiment, above the reaction zone 22, a portion A of the $CO_2$ is removed from the shaft furnace 20 via the third removal apparatus 80 at a temperature $T_3$ and a mass flow rate $m_3$. The third removal apparatus 80 opens into the second removal apparatus 70, and the $CO_2$ gas streams passed onward in the two removal apparatuses are mixed with one another. The $CO_2$ which is then passed onward in the second removal apparatus 70 has a temperature $T_8$ and a mass flow rate $m_8$.

The removal of portion A of the $CO_2$ via the third removal apparatus 80 reduces the exit temperature $T_2$ of the remaining $CO_2$ on removal from the furnace via the second removal apparatus 70. Because of the reduced temperature at the top of the furnace, the loss of energy that occurs as a result of the removal of the $CO_2$ stream $m_C$ from the overall process is significantly reduced compared to prior art processes. The heat capacity flow ratio of $CO_2$ to limestone in the present invention is advantageously in the range from 1 to 2.0, preferably in the range from 1 to 1.6, more preferably in the range from 1 to 1.2. The $CO_2$ filters and fans in the second removal apparatus 70 may also advantageously be designed for correspondingly lower temperatures.

This embodiment further has a connection via a shortcut conduit 71 from the second removal apparatus 70 to the first feed apparatus 40. The shortcut conduit allows a portion D of the $CO_2$ removed by suction via the second removal apparatus 70 at the top of the furnace with a temperature $T_2$ and a mass flow rate $m_D$ to be introduced into the first feed apparatus 40. This makes it possible to control the temperature $T_1$ of the $CO_2$ which is introduced into the shaft furnace 20. The introduction of the $CO_2$ with temperature $T_2$ via the mixing conduit 71 allows fluctuations in the temperature $T_W$ with which the $CO_2$ comes from the heating apparatus 140 to be balanced out. The mixing conduit 71 may have a fan 214.

Since the heating apparatus 140 has a regenerator system 90, particularly the discharge operation of the regenerator 91, 92 in the regenerator system 90 can lead to periodic fluctuations in the temperature $T_W$ with which the $CO_2$ exits from the regenerator 91, 92. Without further control, temperature $T_W$ will correspond to the temperature $T_1$ with which the $CO_2$ is introduced into the shaft furnace 20. In that case, the shaft furnace 20 will then be charged with $CO_2$ having a periodically fluctuating temperature. This also means an energy input into the shaft furnace 20 that fluctuates over time. These fluctuations will affect the temperatures in the shaft furnace, which will correspondingly likewise be subject to fluctuations. Fluctuating temperatures in the shaft furnace are a barrier to uniform lime quality. The apparatus according to the invention and the process according to the invention can avoid the fluctuations in energy input and hence in combustion temperature. In particular, the controlling of temperature $T_1$ via the supply of $CO_2$ at temperature $T_2$ via the shortcut conduit 71 to the $CO_2$ at temperature $T_W$ from the heating apparatus enables the desired control of temperature. Depending on the mixing ratio of $CO_2$ at temperature $T_W$ and $CO_2$ at temperature $T_2$, the temperature $T_1$ can be adjusted and hence controlled. In this embodiment, the heating apparatus 104 is a combination of a regenerator system 90 and an electrical heating system 100.

In addition, FIG. 4 shows an apparatus 1000 in which a portion X of the cooling air removed via the first removal apparatus 60 is directed into the second preheater 120. The heated cooling air is removed from the shaft furnace with temperature $T_5$ and mass flow rate $m_5$. The cooling air is dedusted by means of a suitable hot gas filter or hot gas cyclone 202. A portion X is fed to the second preheater 120 and hence utilized to heat the mass flow $m_B$ to a temperature $T_{2V}$. The cooling air is led off downstream of the second preheater. For this purpose, it is possible to use suitable fans 213. The portion X of the cooling air may be all the cooling air removed from the shaft furnace 20 or else only a portion thereof. If the heating apparatus 140 comprises a regenerator system, it is possible to direct a portion Y of the cooling air removed into the regenerator system 90, where it can be used as combustion air as already described. The proportions X and Y may if required be divided between 0% and 100%, where X+Y=100%.

Figure 5A:
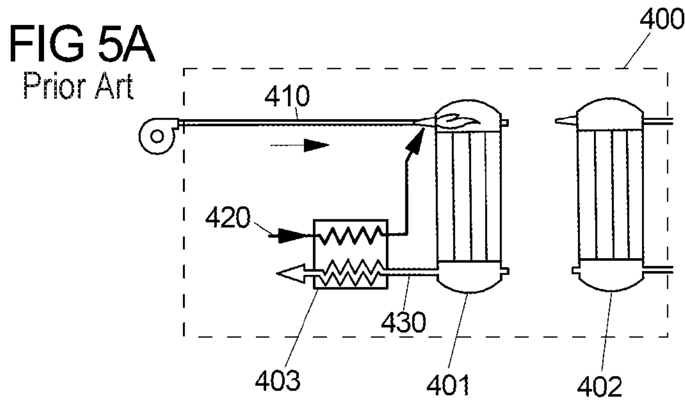
FIG. 5(A) shows a regenerator system which is operated by a process from the prior art.

FIG. 5(A) shows a regenerator system 400 which is operated by a process from the prior art. For charging, combustion gas flows through the regenerator 401. For combustion, lean gas is directed through the preheater 420 via the feed 420 and heated. The heated lean gas is utilized as fuel. The combustion air fed in is cooling air 410 which is removed from the shaft furnace. The combustion gas formed in the combustion is directed into the regenerator 401, which results in charging thereof. The residual heat in the offgas flowing out at the bottom of the regenerator is directed through the preheater 403 and hence utilized for heating of the lean gas. The lean gas used is, for example, blast furnace gas or steel gas. These regenerator systems 400 are used according to the prior art in the steel industry, where the gases mentioned are available.

Figure 5B:
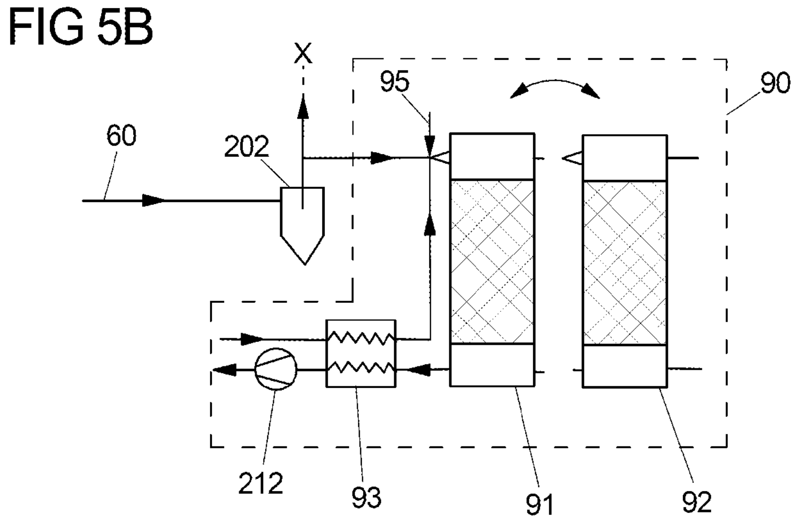
FIG. 5(B) shows a regenerator system which is operated by the present process.

FIG. 5(B), with respect to FIG. 5(A), once again shows a regenerator system 90 which is operated by the present process. This regenerator system 90 enables the flexible utilization of fossil or renewable fuels. In particular, the regenerator system 90 can advantageously be used in the lime industry, in which lean gases, for example blast furnace gas, are unavailable. High-energy fuels are used in the lime industry, for example natural gas. However, these cannot be used in regenerator systems 400 from the prior art, since the high-energy fuels cannot be heated in a preheater. The regenerator system 90 according to the present invention remedies this disadvantage and hence enables uncomplicated use of the invention in the lime industry. A detailed description of the mode of function of the regenerator system 90 can be found in the description of FIG. 3.

Figure 5C:
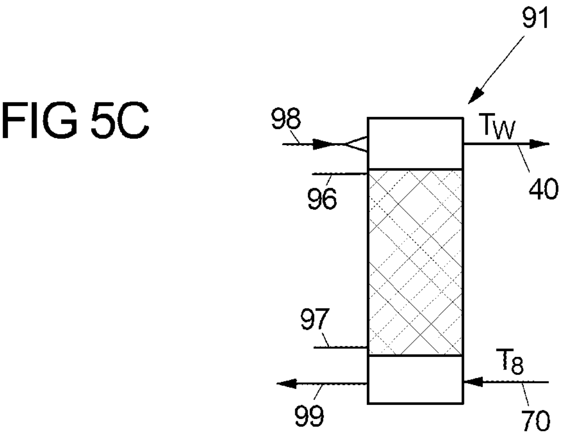
FIG. 5(C) shows a regenerator of a regenerator system.

FIG. 5(C) shows a regenerator 91 of the regenerator system 90. At the top of the regenerator 96, the combustion gas is introduced 98 and flows through the regenerator 91 on charging, and leaves it again at the bottom of the regenerator 97 via the outlet 99. The regenerator 91 is heated to temperature $T_{RK}$ at the top of the regenerator 96, and to temperature $T_{RF}$ at the bottom of the regenerator 97.

On discharge, the $CO_2$ flows into the regenerator via the second removal apparatus 70 at temperature $T_8$ at the bottom of the regenerator 97, flows through it and leaves the regenerator 91 at the top of the regenerator 96 with temperature $T_W$ via the first feed apparatus 40.

Figure 6B:
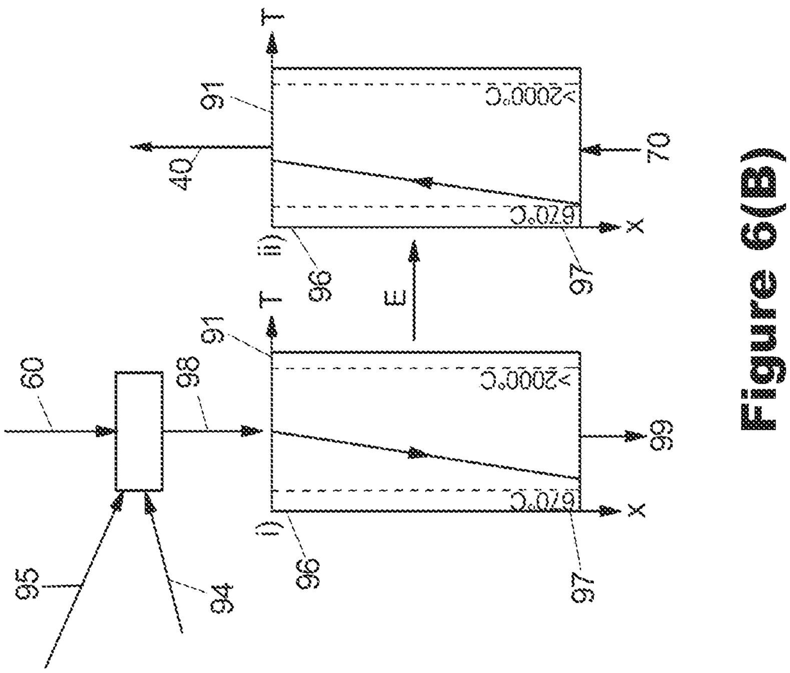
FIG. 6(B) shows the temperature progression in a regenerator system on charging and discharging which is operated by the process according to the invention.
Figure 6A:
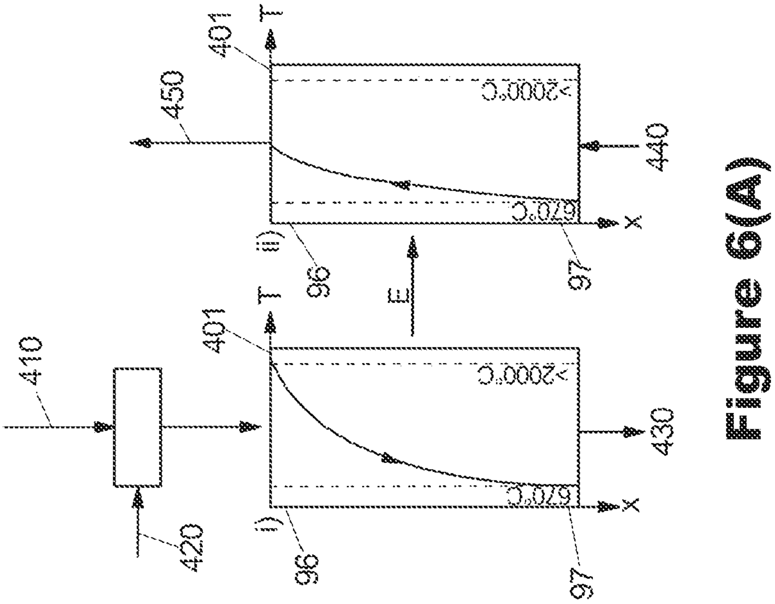
FIG. 6(A) shows the temperature progression in a regenerator system on charging and discharging which is operated by a process from the prior art.

FIG. 6(A) shows the temperature progression in a regenerator system 400 from the prior art, as shown in FIG. 5(A), on charging and discharging. In the diagram i), the regenerator 401 is charged by the feeding 410 of a combustion gas. The combustion gas forms as a result of the combustion of cooling air (feed via cooling air feed 410) which is removed from a shaft furnace with a fuel (feed via fuel feed 420). The mass flow of the combustion gas is therefore determined to a crucial degree by the mass flow of the cooling air. The combustion gas is typically at a high temperature above 2000° C. At the top of the regenerator 96, the storage medium of the regenerator 401 is therefore charged to a temperature above 2000° C. Over the entire length x of the regenerator, the combustion gas releases thermal energy to the storage medium, and leaves the regenerator 401 at the bottom of regenerator 97 typically at a temperature of about 700° C. The diagram ii) shows the discharging of the regenerator 401. $CO_2$ is typically introduced into the bottom of the regenerator 97 at a temperature of about 700° C. via the $CO_2$ feed 440 and directed through the entire length x of the regenerator. At the top of the regenerator 96, the $CO_2$ leaves the regenerator 401 via the outlet 450 at a temperature $T_1$. At the changeover from charging to discharging, the top of the regenerator 96 is therefore supplied firstly with combustion gases at a temperature of above 2000° C. and, straight after the changeover to discharging, with $CO_2$ at a temperature $T_1$. The heat capacity flow ratio between combustion gas that flows through the regenerator system on charging and $CO_2$ that flows through the regenerator system on discharging is well above 1.5, typically in the range from 2 to 2.5 (Yang et al.). At the top of the regenerator 96, the temperature level fluctuates significantly, such that great thermal stresses arise in the storage material. This leads to the numerous disadvantages already described.

FIG. 6(B), by contrast, shows the temperature progression in a regenerator system 90 according to the present invention, as shown in FIG. 5(B), on charging and discharging. In the diagram i), the regenerator 9 is charged by the supply of a combustion gas 98. The combustion gas forms as a result of the combustion of fresh air (supply via fresh air feed 94) and optionally cooling air (supply via first removal apparatus 60), which is drawn off from the shaft furnace, with a fuel (supply via fuel feed 95). The mass flow rate of the combustion gas is determined to a crucial degree by the mass flow rate of the fresh air and is therefore flexibly adjustable. This makes it possible to adjust the heat capacity flow ratio between combustion gas that flows through the regenerator system on charging and $CO_2$ that flows through the regenerator system on discharging in such a way that it is in the range from 0.9 to 1.1. At the top of the regenerator 96, a significantly smaller thermal stress thus acts on the regenerator material. This has a positive effect on the service life of the storage material of the regenerator and hence on the maintenance intensity thereof. The economic viability of the overall process is thus significantly increased.

The combustion gas may, for example, have a temperature of about 1450° C. At the top of the regenerator 96, the storage medium in the regenerator 91 is therefore charged to a temperature of about 1450° C. Over the entire length x of the regenerator, the combustion gas releases thermal energy to the storage medium, and at the bottom of the regenerator 97 leaves the regenerator 401 typically at a temperature of about 800° C. Diagram ii) shows the discharging of the regenerator 91. $CO_2$ is typically introduced into the bottom of the regenerator 97 at a temperature of about 700° C. via the second removal apparatus 70 and directed through the entire length x of the regenerator. At the top of the regenerator 96, the $CO_2$ leaves the regenerator 91 via the first feed apparatus 40 at a temperature of, for example, 1350° C. At the changeover from charging to discharging, the top of the regenerator 96 is therefore supplied firstly with combustion gases at a temperature of about 1450° C. and, straight after the changeover to discharging, with $CO_2$ at a temperature of about 1350° C. The difference in temperature at the top of the regenerator 96 is thus significantly reduced, which means that the thermal stresses that occur are also significantly decreased.

Figure 7:
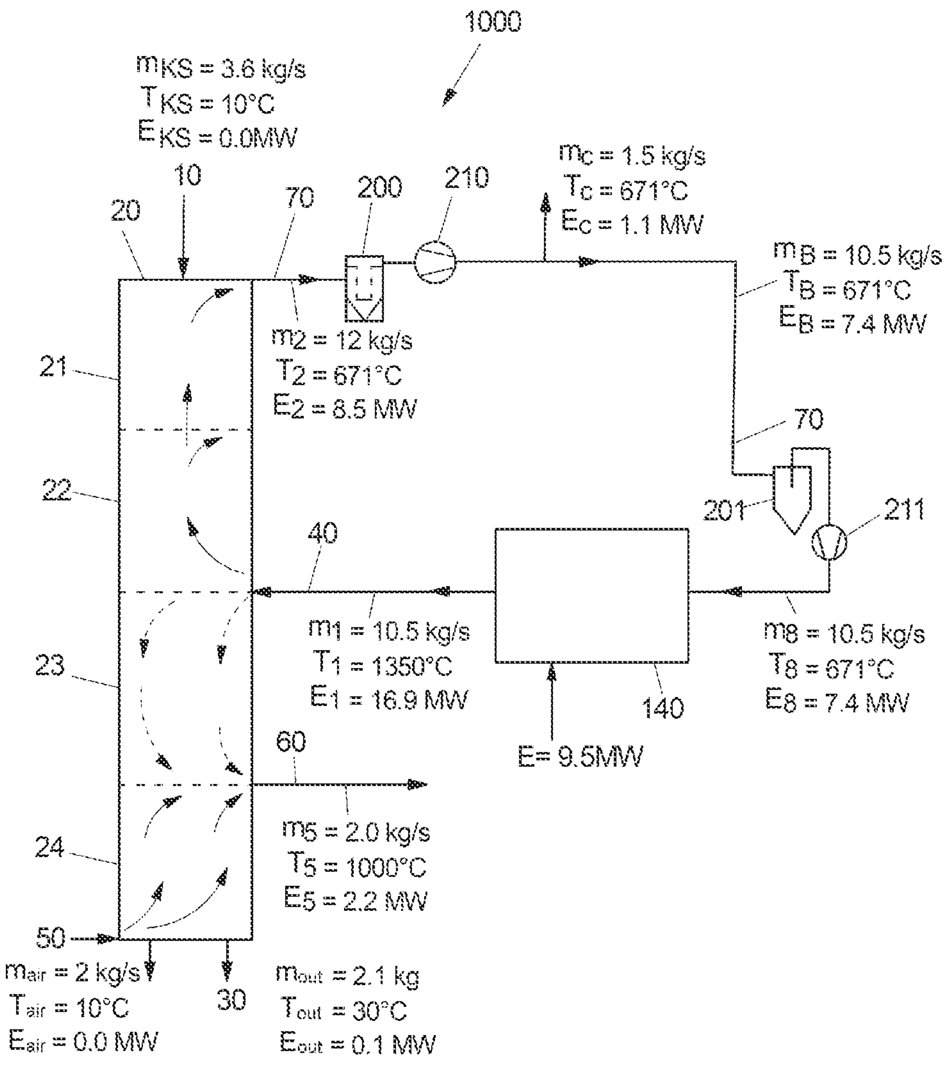
FIG. 7 shows a comparative example of the present invention.
Figure 8:
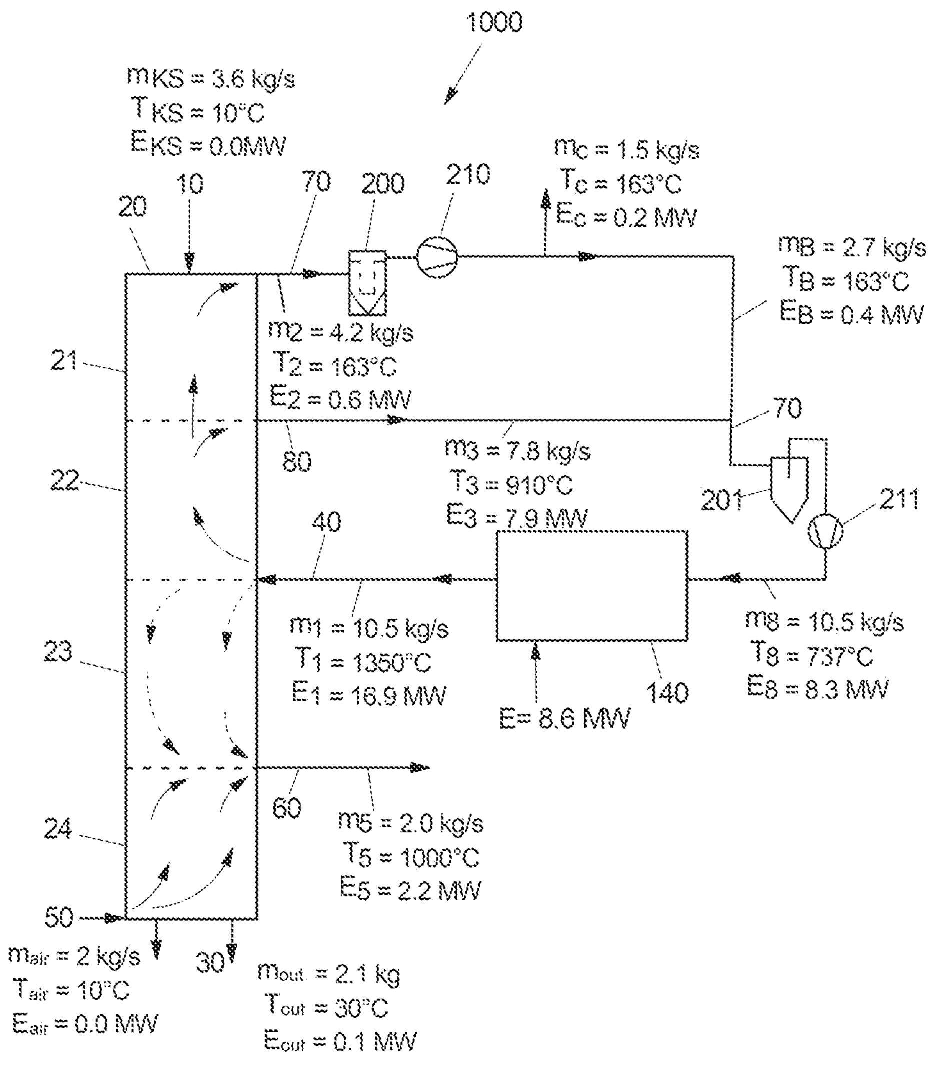
FIG. 8 shows a working example 1 of the present invention.
Figure 9:
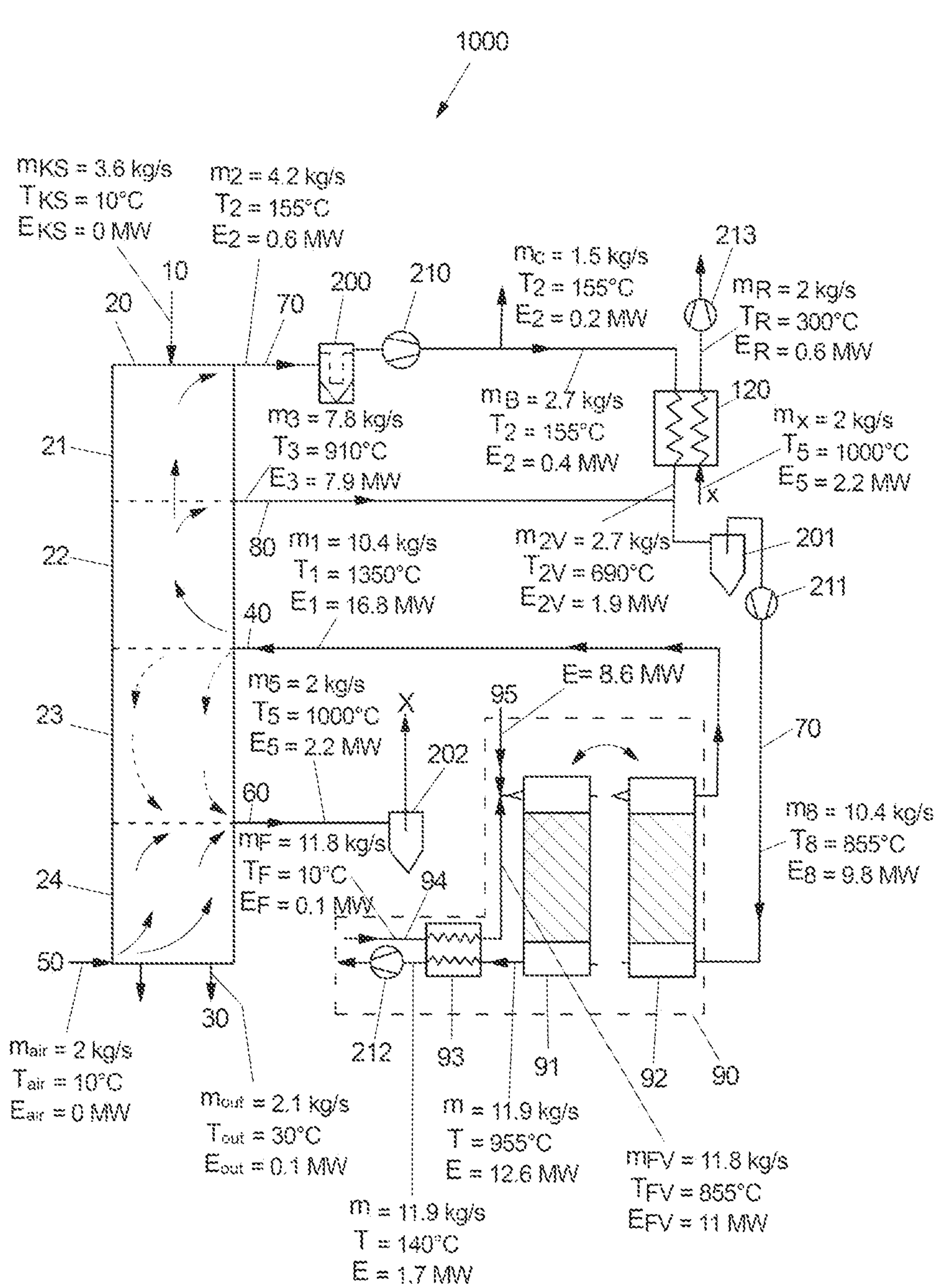
FIG. 9 shows a working example 2 of the present invention.

FIGS. 7 to 9 show a comparative example according to the prior art and two working examples of the invention. For these examples, it was assumed that complete physical separation of the gas atmospheres ($CO_2$ in the reaction zone and cooling air in the cooling zone) is assured. All process parameters such as temperatures and mass flow rates are specified in examples. In addition, the energy flows that are introduced or removed are specified. These were identified in each case by the symbol E and the addition already used for the corresponding temperature and the corresponding mass flow rate. All energy flows reported in the examples are based on a reference temperature of 0° C.

Comparative Example 1

FIG. 7 shows a process example according to the prior art. All the $CO_2$ which is fed to the shaft furnace 20 via the feed apparatus 40 and exits from the limestone during the deacidification flows in the direction of the top of the furnace and is removed via the removal apparatus 70. The heating apparatus 140 is supplied with the flow of energy required for the process. For comparability, it was assumed by way of simplification that this flow of energy can be utilized entirely for heating of the $CO_2$ (mass flow rate $m_5$), and that no heat losses occur, for example, as a result of a combustion process. The heating apparatus here is otherwise unspecified. The heated cooling air which is removed from the shaft furnace 20 via the removal apparatus 60 is not utilized further within the process.

Working Example 1

FIG. 8 shows an embodiment of the present invention that increases the energy efficiency of the process example shown in FIG. 7 according to the prior art. Proceeding from the process example in FIG. 7, according to the invention, the third removal apparatus 80 is used for this purpose, by means of which a portion of the $CO_2$ flowing upward within the shaft furnace 20 is removed and then mixed with the remaining $CO_2$ from the top of the furnace, heated, and supplied again to the shaft furnace 20 via the feed apparatus 40. Thus, not all the $CO_2$ flows in the direction of the top of the furnace, and the mass flow rate $m_2$ and temperature $T_2$ are lowered by comparison. As a result, the $CO_2$ flow rate $m_C$ leaves the process at a lower temperature, which reduces the loss of heat by comparison. This likewise becomes clear by virtue of the lower energy demand for heating of the circulating $CO_2$ (mass flow rate $m_5$) through the heating apparatus 140. The heating apparatus 140 is a regenerator system.

Working Example 2

FIG. 9 shows an embodiment of the present invention having all the features of the invention that have already been described. The process according to the invention was conducted by the embodiment of the invention shown. All the cooling air sucked out by the first removal apparatus 60 was fed here to the second preheater 120. The heating apparatus used was a regenerator system 90. The combustion gas for the loading of the regenerator system 90 was created by the supply of natural gas L as fuel and heated fresh air at temperature $T_{FV}$.

LITERATURE

[Maerz Ofenbau AG] Maerz Ofenbau AG, Sustainable lime burning technology with shaft kilns, ZKG 6/2021

[Yang et al.] Yang et al., Novel Lime Calcination Systems for $CO_2$ Capture and its Thermal-Mass Balance Analysis, ACS Omega, 5 (42), 27413-27424, 2020

[Schiele/Berens] E. Schiele/L. W. Berens, "Kalk" [Lime], Verlag Stahleisen M. B. H. Düsseldorf, 1972, page 190, section 4.3.4.4

LIST OF REFERENCE NUMERALS

10 limestone input
20 shaft furnace
21 preheating zone
22 reaction zone
23 separation zone
24 cooling zone
30 apparatus for discharging burnt lime
40 first feed apparatus
50 second feed apparatus
60 first removal apparatus
70 second removal apparatus
71 shortcut conduit
80 third removal apparatus
90 regenerator system

91, 92 regenerator
93 first preheater
94 feed for fresh air
95 feed for fuel
96 top of regenerator
97 bottom of regenerator
98 combustion gas feed
99 offgas outlet
100 electrical heating system
120 second preheater
140 heating apparatus
200 filter
201 filter
202 filter
210 fan
211 fan
212 fan
213 fan
214 fan
250 fuel supply and air supply
260 cooling air supply
270 lime discharge
280 shaft furnace
290 limestone feed
300 preheating zone
310 reaction zone
320 cooling zone
400 regenerator system
401 regenerator
402 regenerator
403 preheater
410 cooling air feed
420 fuel feed
430 offgas outlet
440 $CO_2$ feed
450 $CO_2$ outlet
1000 apparatus

The invention claimed is:

1. Apparatus for production of burnt lime or dolomite, having:

a shaft furnace having a preheating zone, a reaction zone, a separation zone and a cooling zone;

a first feed apparatus for $CO_2$ at a boundary of the separation zone to the reaction zone;

a first removal apparatus at a boundary of the cooling zone to the separation zone;

a second removal apparatus for $CO_2$ at a start of the preheating zone; and at least one heating apparatus, wherein the at least one heating apparatus has a regenerator system;

wherein the regenerator system has at least two regenerators, a preheater, a feed for fuel and a feed for fresh air;

the second removal apparatus opens into the at least one heating apparatus; and the first feed apparatus is formed by the at least one heating apparatus for the shaft furnace, wherein the shaft furnace also has a third removal apparatus at a boundary of the reaction zone to the preheating zone and the third removal apparatus outside the shaft furnace opens into the second removal apparatus upstream of the at least one heating apparatus, wherein the second removal apparatus is connected directly to the first feed apparatus via a shortcut conduit upstream of a point at which the third removal apparatus opens into it.

2. Apparatus according to claim 1, wherein the at least one heating apparatus also has an electrical heating system.

3. Apparatus according to claim 1, wherein the first removal apparatus is connected to the regenerator system.

4. Apparatus according to claim 1, wherein the first removal apparatus is in contact with the second removal apparatus in a form of a second preheater.

* * * * *